(12) United States Patent
Grubbs (10) Patent No.: US 9,455,831 B1
(45) Date of Patent: Sep. 27, 2016

(54) ORDER PRESERVING ENCRYPTION METHOD

(71) Applicant: Skyhigh Networks, Inc., Cupertino, CA (US)

(72) Inventor: Paul Grubbs, Sunnyvale, CA (US)

(73) Assignee: Skyhigh Networks, Inc., Campbell, CA (US)

(*) Notice: Subject to any disclaimer, the term of this patent is extended or adjusted under 35 U.S.C. 154(b) by 48 days.

(21) Appl. No.: 14/490,432

(22) Filed: Sep. 18, 2014

(51) Int. Cl.
*H04L 9/00* (2006.01)
*H04L 9/28* (2006.01)
*H04L 29/06* (2006.01)

(52) U.S. Cl.
CPC ............ *H04L 9/28* (2013.01); *H04L 9/008* (2013.01); *H04L 63/0457* (2013.01)

(58) Field of Classification Search
CPC ................................................. H04L 9/008
See application file for complete search history.

(56) References Cited

U.S. PATENT DOCUMENTS

| | | | | |
|---|---|---|---|---|
| 5,729,724 A * | 3/1998 | Sharangpani | ............ | G06F 5/00 708/495 |
| 6,029,243 A * | 2/2000 | Pontius | ................... | G06F 7/483 708/495 |
| 2001/0051936 A1* | 12/2001 | Michalewicz | ......... | G06N 5/003 706/46 |
| 2005/0147240 A1* | 7/2005 | Agrawal | ................ | G06F 21/60 380/28 |
| 2011/0154012 A1* | 6/2011 | Kusmanoff | ............... | G06F 7/00 713/100 |
| 2012/0023149 A1* | 1/2012 | Kinsman | ................... | G06F 7/38 708/204 |
| 2014/0365500 A1* | 12/2014 | Futamura | .......... | G06F 17/30985 707/743 |

OTHER PUBLICATIONS

Boldyreva, Alexandra, et al. "Order-preserving symmetric encryption." Advances in Cryptology-EUROCRYPT 2009. Springer Berlin Heidelberg, 2009. 224-241.*
Boldyreva, Alexandra, Nathan Chenette, and Adam O'Neill. "Order-preserving encryption revisited: Improved security analysis and alternative solutions." Annual Cryptology Conference. Springer Berlin Heidelberg, 2011.*
Popa, Raluca Ada, Frank H. Li, and Nickolai Zeldovich. "An ideal-security protocol for order-preserving encoding." Security and Privacy (SP), 2013 IEEE Symposium on. IEEE, 2013.*
Raluca Ada Popa, "cryptdb/ope.cc", GitHub, Jan. 3, 2014, https://github.com/CryptDB/cryptdb/blob/master/crypto/ope.cc, accessed Dec. 16, 2015.*
Bronson, Nathan G., et al. "A practical concurrent binary search tree." ACM Sigplan Notices. vol. 45. No. 5. ACM, 2010.*
Bowen Zhang and Xinwei Li "Binary Search Tree with SIMD Bandwidth Optimization using SSE" May 7, 2012, http://cs.nyu.edu/~lerner/spring12/Preso06-SIMDTree.pdf, accessed Jul. 21, 2016.*

(Continued)

*Primary Examiner* — Yin-Chen Shaw
*Assistant Examiner* — Michael Guirguis
(74) *Attorney, Agent, or Firm* — Van Pelt, Yi & James LLP (57) ABSTRACT

An order-preserving encryption (OPE) encryption method receives a plaintext (clear text) and generates a ciphertext (encrypted text) using a software arbitrary precision floating point libraries during initial recursive computation rounds. In response to the ciphertext space reducing to breakpoint, the OPE encryption method continues computations using a hardware floating point processor to accelerate the computation. In this manner, the OPE encryption method enables efficient order preserving encryption to enable range queries on encrypted data.

12 Claims, 5 Drawing Sheets

(56) References Cited

OTHER PUBLICATIONS

Shewchuk, Jonathan Richard. "Adaptive precision floating-point arithmetic and fast robust geometric predicates." Discrete & Computational Geometry 18.3 (1997): 305-363.*

Cannizzo, Fabio. "Fast and Vectorizable Alternatives to Binary Search." arXiv preprint arXiv:1506.08620v1, May 25, 2013.*

Kalavade, Asawaree, and Edward A. Lee. "The extended partitioning problem: hardware/software mapping, scheduling, and implementation-bin selection." Design Automation for Embedded Systems 2.2 (1997): 125-163.*

Zhang, Yuanrui, and Mahmut Kandemir. "A hardware-software codesign strategy for loop intensive applications." Application Specific Processors, 2009. SASP'09. IEEE 7th Symposium on. IEEE, 2009.*

Revy, Guillaume. "Implementation of binary floating-point arithmetic on embedded integer processors-Polynomial evaluation-based algorithms and certified code generation." Diss. Université de Lyon; Ecole normale supérieure de lyon-ENS LYON, 2009.*

Lam, Michael O., et al. "Automatically adapting programs for mixed-precision floating-point computation." Proceedings of the 27th international ACM conference on International conference on supercomputing. ACM, 2013.*

Boldyreva et al., Order-Preserving Symmetric Encryption, 2009.

* cited by examiner

ORDER PRESERVING ENCRYPTION METHOD

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

With cloud-based services coming into widespread use, data security for data and files stored on the cloud-based service providers become an important issue.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, an order-preserving encryption (OPE) method receives a plaintext (clear text) and generates a ciphertext (encrypted text) that preserves the sort order of the plaintext by performing a binary search of the ciphertext space using a processor that calls one or more software arbitrary precision floating point libraries during initial recursive computation rounds to achieve high precision. In response to the encryption function range or ciphertext space reducing to a given value ("breakpoint"), the OPE encryption method continues the binary search with the processor switching to call a hardware fixed precision floating point processor to accelerate the remaining computation. In this manner, the OPE encryption method enables efficient order preserving encryption so as to enable range queries on encrypted data.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, in the present description, "cloud content" or "cloud data" refers to data or files being processed or stored on a cloud-based service on behalf of an enterprise. The cloud-based service may be a cloud storage service, customer relationship management (CRM) services, information technology (IT) services or other types of cloud services. The cloud data or content may be stored as data files or in other formats.

In the following description, the term "data" will be used to refer to data or files or other resources in any format that is being exchanged in the network environment described herein.

With the proliferation of cloud-based services, an enterprise may wish to adopt one or more cloud-based services for data storage or other applications. Furthermore, the enterprise may deploy security measures to monitor and control the use of the cloud-based services from the enterprise's own private data network or by the enterprise's employees and users. In some cases, an enterprise data network may redirect network traffic between a client device and a cloud-based service through a network intermediary. The client device may be situated within the enterprise data network or be associated with the enterprise. The network intermediary may provide monitoring and assessment of the enterprise's cloud usage.

Figure 1:
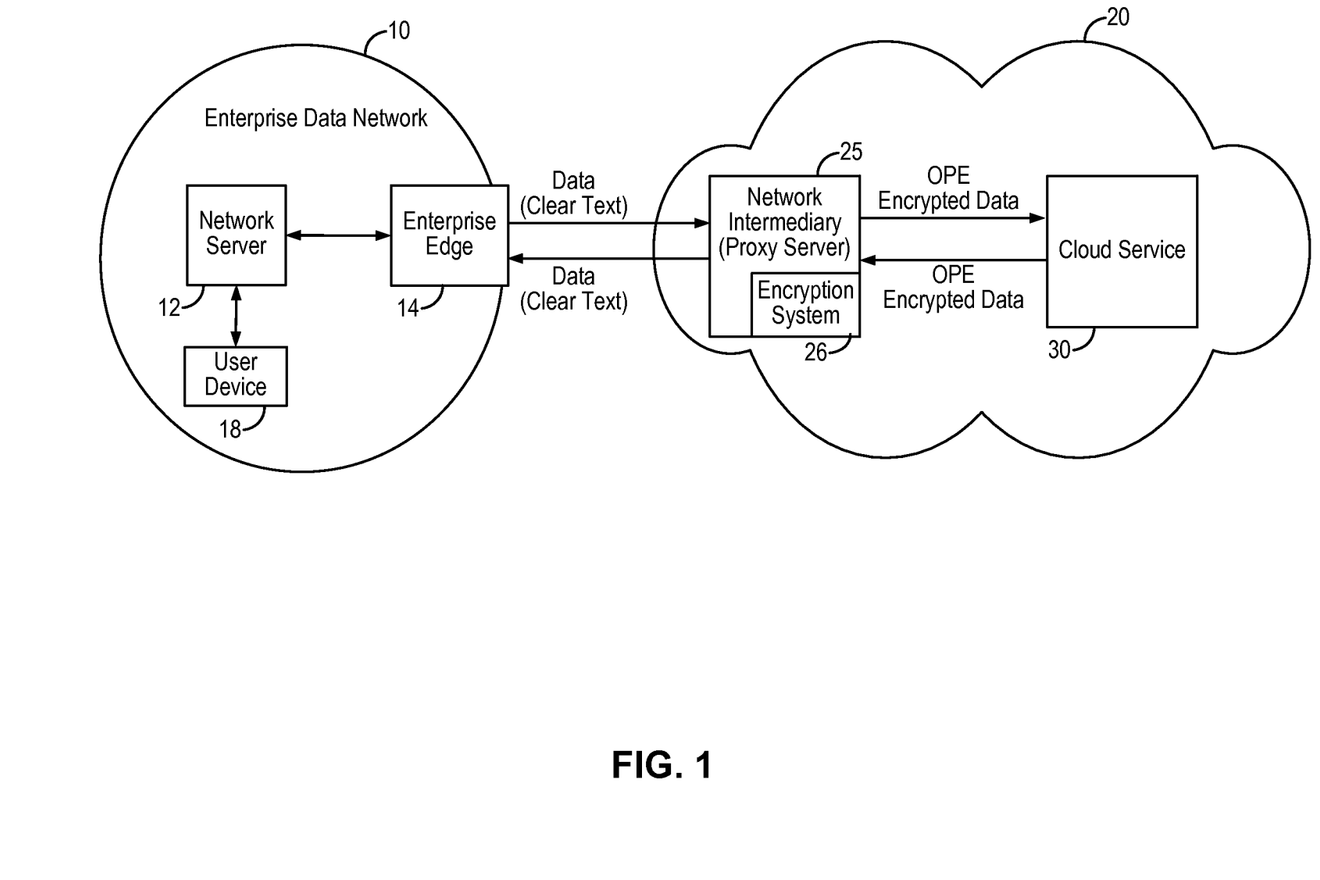
FIG. 1 is a block diagram illustrating a network intermediary implementing encryption of cloud data on behalf of an enterprise in some embodiments.

In some cases, the network intermediary is used to provide additional security functions, such as data encryption for uploaded data, such as encryption of sensitive data to be stored in a cloud service provider. FIG. 1 is a block diagram illustrating a network intermediary implementing encryption of cloud data on behalf of an enterprise in some embodiments. Referring to FIG. 1, an enterprise may operate an enterprise data network 10 including one or more network servers 12 communicating with one or more user devices 18. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as cloud service 30, that are deployed on the public data network 20. Network traffic form the user device 18 is sent to the network server 12 and travels to the enterprise network edge 14 and then onto the cloud service providers. In the return path, network traffic from the cloud service providers are received at the enterprise network edge 14 and then transmitted onto the network server 12 to be distributed to the user device 18.

To ensure security associated with the use of one or more cloud based services, the enterprise may redirect all network traffic destined for one or more cloud service providers through a network intermediary 25, which can be implemented as a network proxy server. In the present description, a proxy server refers to a server, which can be a computer system or a software application, that acts as an intermediary for requests from clients seeking resources from other servers. The network intermediary 25 may be configured as reverse/forward proxies. Thus, requests and data from the user device are intercepted by the network intermediary 25 before reaching the cloud service 30. As used herein, the term "data" will be used to refer to data or files or resources in any format that is being exchanged in the network environment described herein. To implement security of data at rest, the network intermediary 25 may encrypt the outgoing data from the enterprise before sending the data onto the cloud service. The cloud-based service may be a cloud storage service, customer relationship management (CRM) services, information technology (IT) services or other types of cloud services. In one embodiment, the network intermediary 25 is a cloud-based service and may be deployed on the publicly accessible Internet, such as public data network 20. In other embodiments, the network intermediary 25 may be deployed on a private data network of an enterprise, or be deployed on a third party private data network.

In some embodiments, the network intermediary 25 includes an encryption system 26 which encrypts and decrypts data based on one or more encryption algorithms. The data can be a file or data in any formats. The encryption system may utilize keys, algorithms, pseudo random number generators and encoding algorithms suitable for encrypting the data from the user device. In some embodiments, the encryption system 26 implements order-preserving encryption, as will be explained in more detail below.

As thus configured, the user device 18 in the enterprise data network 10 uploads data in clear text or plaintext to be processed or stored on the cloud service 30. The user's data is intercepted by the network intermediary 25. The network intermediary 25 encrypts the plaintext data and forwards the encrypted data (ciphertext) to the cloud service provider 30 on behalf of the enterprise. In this manner, data security is ensured as data are stored on the cloud service 30 in an encrypted format. Any person accessing the cloud data on the cloud service provider directly will only see encrypted data. When data is to be retrieved from the cloud service 30, the network intermediary 25 retrieves the encrypted data from the cloud service and decrypts the data. The decrypted data is then provided to the requesting user device 18 of the enterprise data network 10. With the use of the network intermediary 25 incorporating an encryption system, the enterprise makes use of cloud based services with the security of the cloud data and content being encrypted at rest.

In some embodiments, the enterprise may employ cloud services for maintaining data in a database. Accordingly, the enterprise may store data in a database table at the cloud service where the database table may include fields designated for storing specified data values. For example, the database table may include fields for storing character values, such as names and country, and fields for storing integers, such as social security numbers and birthdays. In some cases, it may be desirable to be able to sort or query the data stored in the database table at the cloud service. Furthermore, the cloud service may need to index the stored data it receives. Accordingly, when data in a database table is to be stored encrypted at rest, it is desirable that the encrypted text or ciphertext preserves the sort order of the corresponding plaintext so that sorting or data query can be performed later on the ciphertext.

Order-preserving encryption (OPE), also referred to as order-preserving symmetric encryption, is a deterministic encryption scheme using an encryption function that preserves the sort order of the plaintexts. In the present description, sort order refers to the alphabetical or numerical or alpha-numerical ordering of the plaintexts. More specifically, OPE encryption algorithms generate ciphertexts that preserve the sort order of the corresponding plaintexts. When an OPE encryption algorithm is used, encrypted data or ciphertexts stored in a database may be indexed or queried and the database table returns stored encrypted data or ciphertext whose decrypted value fall within the range of the query request.

In general, OPE is a recursive algorithm and may be implemented by sampling a random order-preserving function from a specific domain and range on-the-fly. More specifically, OPE can be described as performing a binary search of the random order-preserving function and assigning ciphertext to plaintext using ciphertext values within a given ciphertext space. OPE operation typically begins with a large ciphertext space and then narrows down to smaller and smaller ciphertext space over successive recursive cycles. OPE schemes typically require underlying floating-point operations that can be performed to infinite precision, or at least to a high degree of precision. Accordingly, OPE implementation is generally computationally intensive and the computation speed can be very slow.

An example OPE implementation is described in A. Boldyreva, et al., "Order-Preserving Symmetric Encryption," Advances in Cryptology—CRYPTO 2011, $31^{st}$ Annual International Cryptology Conference, P. Rogaway ed., LNCS, Springer, 2011, which reference is incorporated herein by reference in its entirety.

In embodiments of the present invention, an order-preserving encryption (OPE) encryption method receives a plaintext (clear text) and generates a ciphertext (encrypted text) that preserves the sort order of the plaintext by performing a binary search of the ciphertext space using a processor that calls one or more software arbitrary precision floating point libraries during initial recursive computation rounds to achieve high precision. When the encryption function range reduces to a given value, or "breakpoint," the OPE encryption method continues the binary search with the processor switching to call a hardware fixed precision floating point processor to accelerate the remaining computation. In this manner, the OPE encryption method optimizes the performance of the OPE implementation and increases the OPE computational efficiency by the selective use of software and hardware to process the encryption computations. In some embodiments, the network intermediary 25 (FIG. 1) incorporates an OPE encryption system 25 to implement the OPE encryption method of the present invention to encrypt data to be stored on a cloud service provider on behalf of an enterprise so as to preserving the sort order of the encrypted data.

As described above, OPE implementation requires floating point operations that can be performed to infinite precision. Although hardware processors can perform computations very fast, hardware processors generally do not have enough precision for the entire OPE computation. On the other hand, while software floating point library with arbitrary precisions can be used to obtain the desired precision in the floating point operations, computations by calling software libraries tend to be very slow. The OPE encryption method of the present invention optimizes the encryption computation by a deliberate combination of software and hardware processing.

In the present description, an order-preserving encryption function refers to an encryption function that generates ciphertext that preserves the sort order (alphabetical or numerical or alpha-numerical) of the plaintext. For example, let F(t) be an order preserving encryption function, for plaintext values t1 and t2 where t1<t2 in the sort order, the OPE function will generates F(t1) and F(t2) where F(t1)<F(t2).

Figure 2:
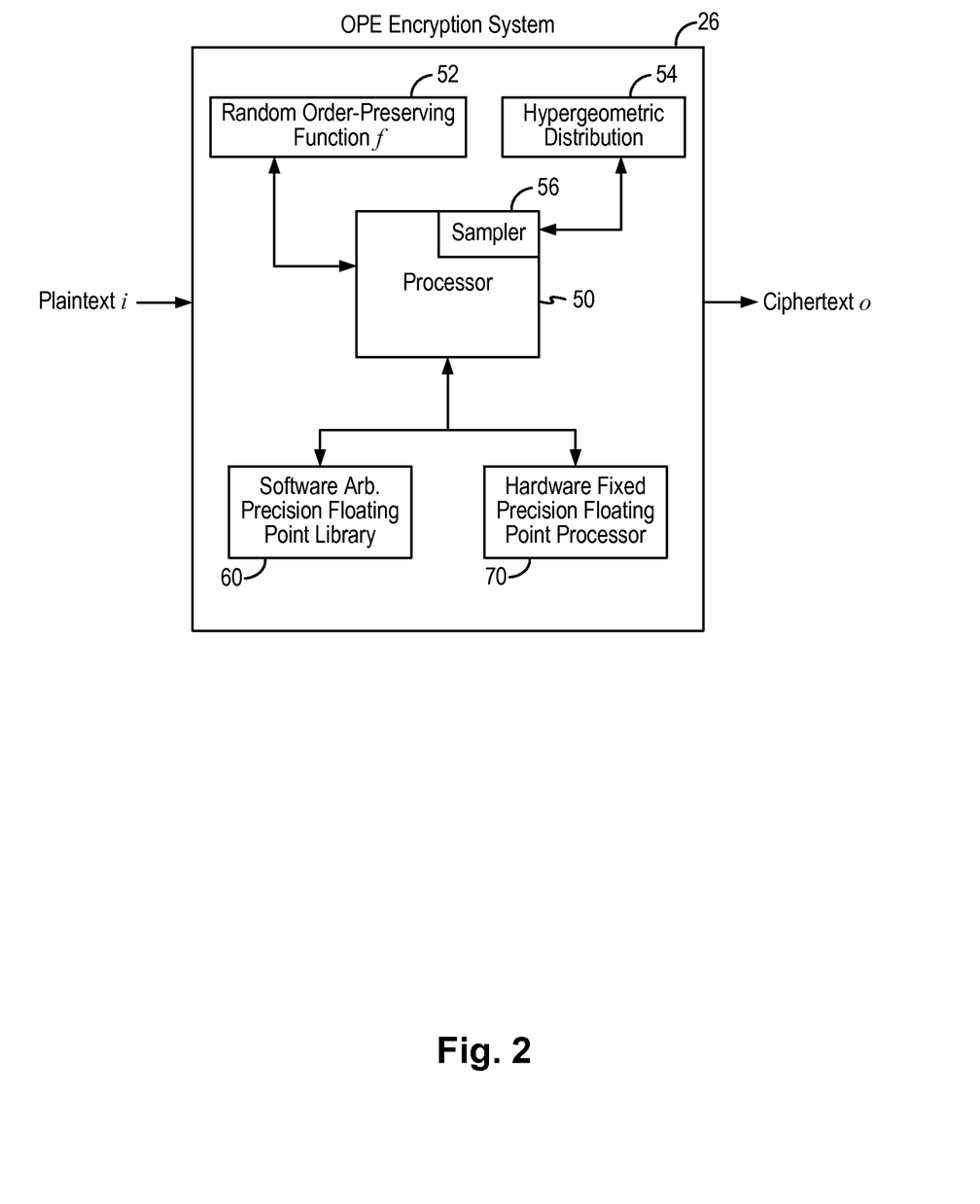
FIG. 2 is a block diagram of an OPE encryption system in which the OPE encryption method can be implemented in embodiments of the present invention.

In embodiments of the present invention, the OPE encryption method is implemented in software using a processor. FIG. 2 is a block diagram of an OPE encryption system in which the OPE encryption method can be implemented in embodiments of the present invention. Referring to FIG. 2, in embodiments of the present invention, the OPE encryption method is implemented in a processor 50 which uses a hypergeometric probability distribution 54 to recursively sample a random order-preserving function $f$ 52. The random order-preserving function $f$ can be described as an ordered list of M elements within a given ciphertext space N. For example, the ciphertext space can have a range of n-bits with $N=2^n$ possibilities in the ciphertext space. In embodiments of the present invention, the OPE encryption method implements a recursive algorithm that performs a binary search of the ciphertext space using the hypergeometric distribution to assign a given element of the ordered list as the ciphertext of a given plaintext.

More specifically, for a random order-preserving function $f$ having a domain of M and a range of N, the random order-preserving function $f$ can be described as an ordered list of M elements randomly selected from the range N. To encrypt a plaintext i within the domain M, the ith element of the ordered list is provided as the ciphertext for the plaintext i. In actual implementation, the entire random order-preserving function $f$ is typically not generated in advance. Rather, the random order-preserving function $f$ is sampled to generate an element of the ordered list on-the-fly to use as the ciphertext. This type of sampling is sometimes referred to as "lazy sampling."

In embodiments of the present invention, the OPE encryption method receives an input plaintext i and generates an output ciphertext o that preserves the sort order of the input plaintext i as follows. The OPE encryption method employs a random order-preserving function $f$ 52 having a domain of M and a range of N. In other words, at the start of the encryption operation, the plaintext i may be of m-bit and belongs to a domain space of $M=2^m$ possibilities and the M domain space maps to an n-bit range space or ciphertext space of $N=2^n$ possibilities. The processor 50 of the OPE encryption system 26 includes a sampler 56 to sample the random order-preserving function $f$ by performing recursive binary search of the domain down to the input plaintext i. In particular, the recursive search algorithm starts with the entire domain M and the entire range N. The OPE encryption method uses an encryption key k to generate a pseudorandom value and supplies the pseudorandom value with a range gap value y to the sampler 56. The sampler 56 samples from the hypergeometric distribution 54 to generate a domain gap x. The input plaintext i is compared against the domain gap x to narrow the binary search on the domain space. More specifically, the comparison operation determines which segment of the domain space to search next— the segment above the domain gap x or the segment below the domain gap x. The OPE encryption method recurs on the domain space search until the domain space converge to a single point. The single domain point may corresponds to a set of elements in the ciphertext space and one of the elements is selected as the ciphertext o for the input plaintext i.

During the OPE recursive search algorithm, the size of the ciphertext space shrinks rapidly with each successive recursive round. For example, the OPE encryption method may start the sampling in a ciphertext space of 72 bits with $2^{72}$ possibilities. After a few recursive cycles, the ciphertext space may be reduced to a space of 65 bits with $2^{65}$ possibilities. In embodiments of the present invention, the OPE encryption method relies on one or more software arbitrary precision floating point libraries 60 to perform computations for large ciphertext space to ensure high level of precision. Eventually, as the recursive search algorithm progresses, the ciphertext space shrinks down to a level which can be efficiently handled by a hardware fixed precision floating point processor. For example, the ciphertext space may shrink down to 128 bits (or $2^9$ possibilities) or 64 bits (or $2^8$ possibilities). In embodiments of the present invention, the OPE encryption method then switches to use a hardware fixed precision floating point processor 70 to perform the computations at a much faster rate. The OPE encryption method of the present invention advantageously employs both software arbitrary floating point libraries and hardware fixed precision floating point processors at different stages of the computation to achieve high precision and also to increase the efficiency of the encryption operation.

Figure 3:
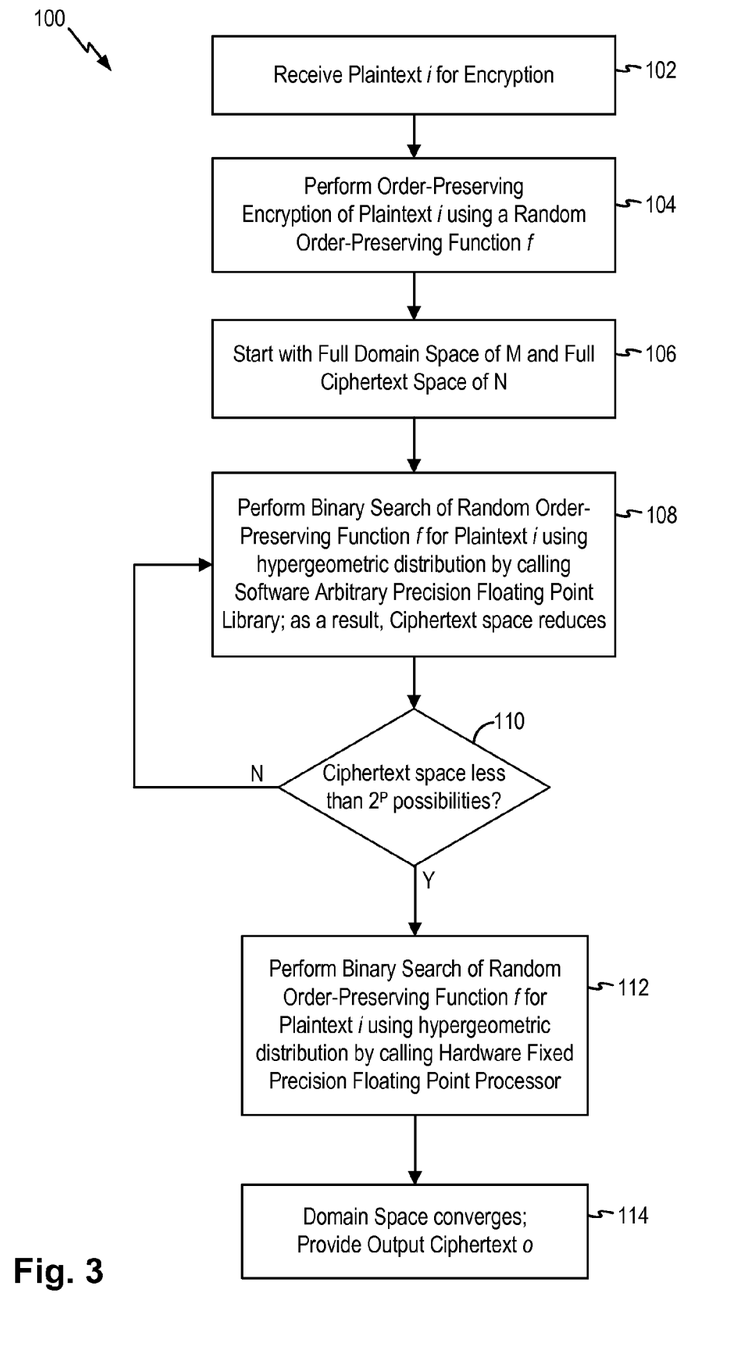
FIG. 3 is a flow chart illustrating an OPE encryption method in embodiments of the present invention.

FIG. 3 is a flowchart illustrating an OPE encryption method in embodiments of the present invention. In some embodiments, the method may be implemented in the network intermediary 25 of FIG. 1 or the OPE encryption system 26 of FIG. 2. Referring to FIG. 3, a method 100 receives a plaintext i for encryption (102). For example, the network intermediary may intercept data being uploaded from a user to a cloud storage service. Instead, the data is sent to the network intermediary for encryption. At 104, the method 100 performs order-preserving encryption of the plaintext i using a random order-preserving function $f$. The order-preserving encryption algorithm starts at the full domain space M and the full ciphertext space N (106).

At the start of the encryption process, the method 100 performs a binary search of the random order-preserving function $f$ for plaintext i by sampling using a hypergeometric distribution using a processor that calls a software arbitrary precision floating point library (108). As a result of the binary search operation, the ciphertext space reduces.

More specifically, as a result of the binary search operation, the ciphertext space reduces in half at each binary search operation.

The method 100 assesses whether the ciphertext space is less than $2^P$ possibilities (110). For example, the method 100 may access the ciphertext space to determine if the data string being processed is less than P-bit. In response to the ciphertext space being greater than $2^P$ possibilities (110), the method 100 returns to 108 to continue the binary search operation with the processor calling the software arbitrary precision floating point library.

When the binary search operation progresses to a breakpoint where the ciphertext space is reduced to less than $2^P$ possibilities (110), the method 100 then performs binary search of the random order-preserving function f for plaintext i using a hypergeometric distribution with the processor calling a hardware fixed precision floating point processor (112). The method 100 performs the binary search recursively until the domain space of the plaintext i converges. The method 100 then selects an element in the ciphertext space corresponding to the converged domain space and provides the selected element as the output ciphertext o for the input plaintext i (114).

In some embodiments, P can be 8 or 9 which corresponds to ciphertext space possibilities of $2^8$ (64) or $2^9$ (128). Thus, the OPE encryption method performs the binary search by calling the software arbitrary precision floating point library until the ciphertext space reduces to 128 or 64. That is, the data string in the ciphertext space being processed has less the 8 or 9 bits. Then, the OPE encryption method switches to calling a hardware fixed precision floating point processor to speed up the remaining computations.

In other embodiments, the OPE encryption method may employ two or more software arbitrary precision floating point libraries to further improve the efficiency of the encryption computation operation. That is, in the above described embodiments, the OPE encryption method uses a single breakpoint P to switch from processing by calling a software library to processing by calling a hardware floating point processor. In other embodiments, the OPE encryption method can be implemented using multiple breakpoints and calling multiple software floating point libraries to further accelerate the encryption computation with the last portion of the computation being processed by calling the hardware fixed precision floating point processor. Furthermore, the software floating point libraries may include arbitrary precision libraries for precision and fixed precision libraries for computation speed.

Figure 4:
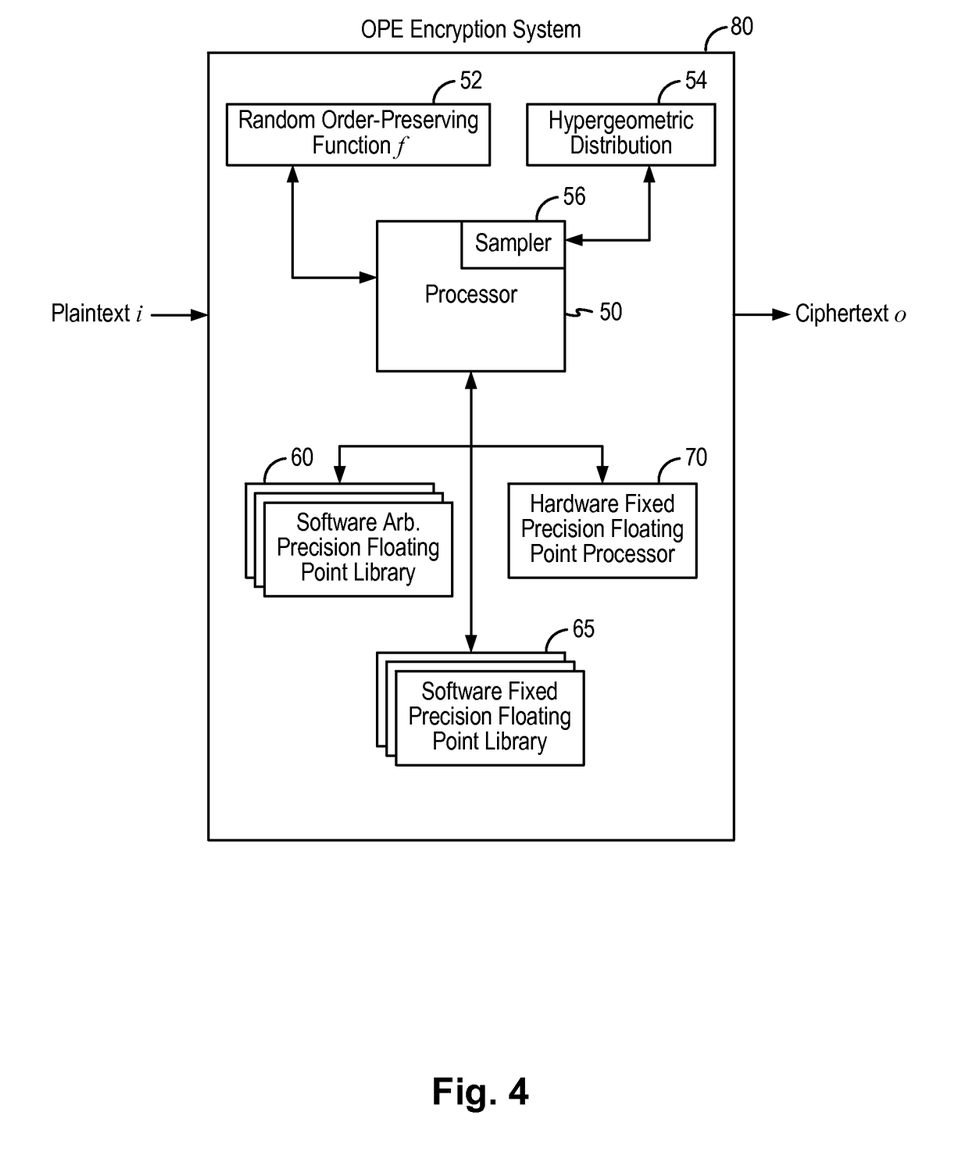
FIG. 4 is a block diagram of an OPE encryption system in which the OPE encryption method in alternate embodiments of the present invention.

FIG. 4 is a block diagram of an OPE encryption system in which the OPE encryption method in alternate embodiments of the present invention. In exemplary embodiment shown in FIG. 4, an OPE encryption system 80 includes a processor 50 which is configured to call one or more software arbitrary precision floating point libraries 60, or one or more software fixed precision floating point libraries 65, and a hardware fixed precision floating point processor 70 for performing OPE computations. During the initial recursive computation cycles, the processor 50 performs the binary search by calling one or more software arbitrary precision floating point libraries 60. As the computation progresses, the processor 50 performs the binary search by calling one or more software fixed precision floating point libraries 65. When the ciphertext space is reduced to a breakpoint which can be handled efficiently by the hardware fixed precision floating point processor, the processor 50 then switches to call the hardware fixed precision floating point processor 70 to complete the OPE encryption operation.

Figure 5:
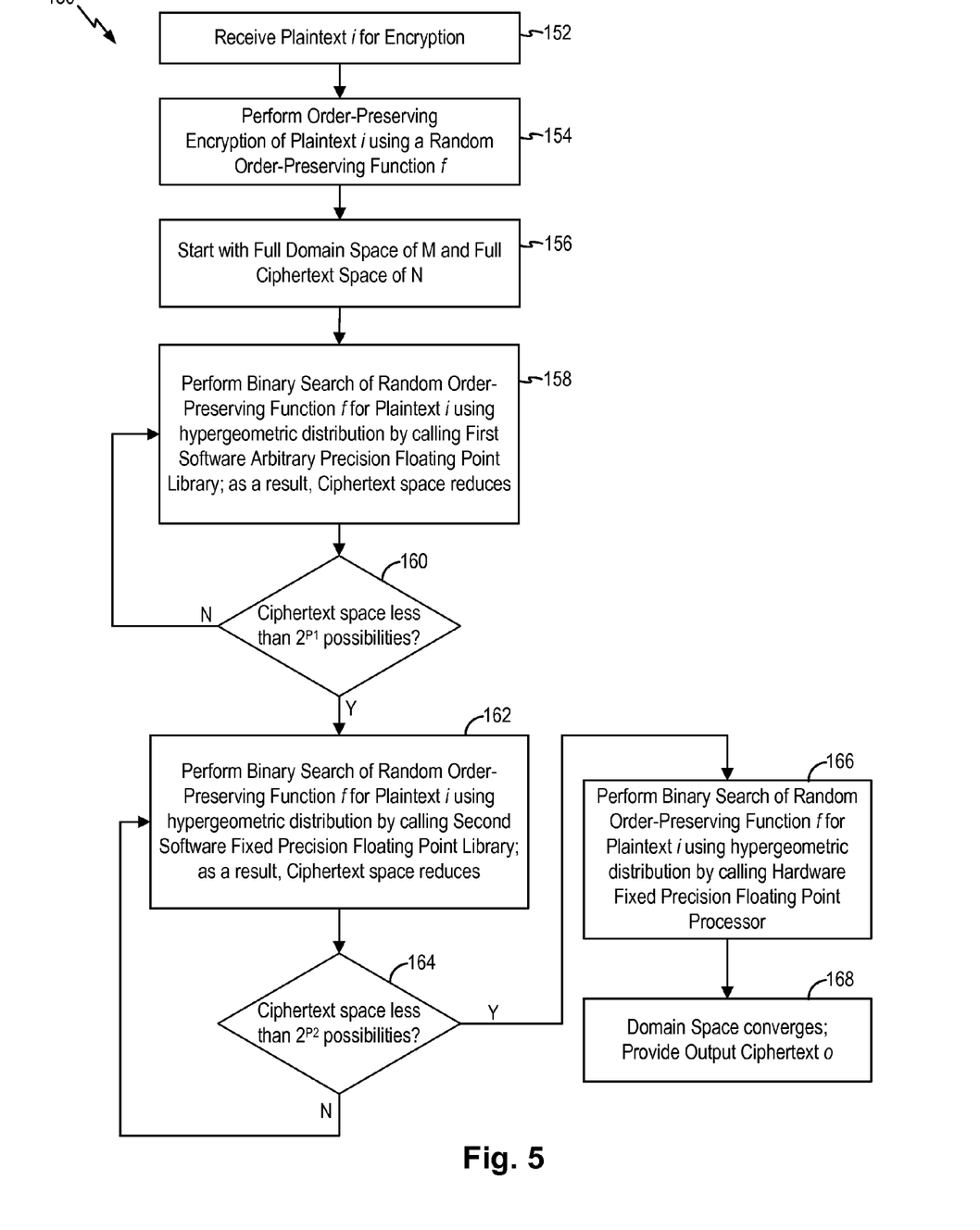
FIG. 5 is a flow chart illustrating an OPE encryption method in alternate embodiments of the present invention.

FIG. 5 is a flowchart illustrating an OPE encryption method in alternate embodiments of the present invention. In some embodiments, the method may be implemented in the network intermediary 25 of FIG. 1 or the OPE encryption system of FIG. 4. Referring to FIG. 5, a method 150 receives a plaintext i for encryption (152). For example, the network intermediary may intercept data being uploaded from a user to a cloud storage service. Instead, the data is sent to the network intermediary for encryption. At 154, the method 150 performs order-preserving encryption of the plaintext i using a random order-preserving function f. The order-preserving encryption algorithm starts at the full domain space M and the full ciphertext space N (156).

The method 150 performs a binary search of the random order-preserving function f for plaintext i by sampling using a hypergeometric distribution using a processor that calls a first software arbitrary precision floating point library (158). As a result of the binary search operation, the ciphertext space reduces. More specifically, as a result of the binary search operation, the ciphertext space reduces in half at each binary search operation. The method 150 then assesses whether the ciphertext space is less than $2^{P1}$ possibilities (160). For example, the method 150 may access the ciphertext space to determine if the data string being processed is less than P1-bit. In response to the ciphertext space being greater than $2^{P1}$ possibilities, the method 150 returns to 158 to continue the binary search operation with the processor calling the first software arbitrary precision floating point library.

When the binary search operation progresses to the first breakpoint where the ciphertext space is reduced to less than $2^{P1}$ possibilities (160), the method 150 then performs binary search of the random order-preserving function f for plaintext i using a hypergeometric distribution with the processor calling a second software fixed precision floating point library (162). For example, the second software fixed precision floating point library may have less precision than the first software arbitrary precision floating point library. As a result of the binary search operation, the ciphertext space reduces, for example, reduces in half at each binary search operation. The method 150 assesses whether the ciphertext space is less than $2^{P2}$ possibilities (164). For example, the method 150 may access the ciphertext space to determine if the data string being processed is less than P2-bit. In response to the ciphertext space being greater than $2^{P2}$ possibilities, the method 150 returns to 162 to continue the binary search operation with the processor calling the second software fixed precision floating point library.

When the binary search operation progresses to the second breakpoint where the ciphertext space is reduced to less than $2^{P2}$ possibilities (164), the method 150 then performs binary search of the random order-preserving function f for plaintext i using a hypergeometric distribution with the processor calling a hardware fixed precision floating point processor (166). The method 150 performs the binary search recursively until the domain space of the plaintext i converges. The method 150 then selects an element in the ciphertext space corresponding to the converged domain space and provides the selected element as the output ciphertext o for the input plaintext i (168).

In some embodiments, the first breakpoint P1 may be 113 which corresponds to ciphertext space of $2^{113}$ possibilities and the second breakpoint P2 may be 50 which corresponds to ciphertext space of $2^{50}$ possibilities. Thus, the OPE encryption method uses a first software arbitrary precision floating point library until the ciphertext space reduces to the first breakpoint (P1) and then the OPE encryption method switches to a second, less precise, software fixed precision floating point library until the ciphertext space reduces to the second breakpoint (P2). Finally, the OPE encryption method switches to using a hardware floating point processor.

In other embodiments, additional software libraries may be used by introducing additional breakpoints during the computation process. The software libraries may be arbitrary precision or fixed precision. The use of two software libraries in FIG. 5 is illustrative only and not intended to be limiting.

Furthermore, in the above-described embodiments, a hypergeometric distribution is used to sample the random order-preserving function. In other embodiments, other suitable probability distribution may be used to sample the random order-preserving function.

The OPE encryption method of the present invention realizes of the advantage of efficient computation to enable practical real-world application of order-preserving encryption. By leveraging the precision of software floating point libraries and the speed of hardware floating point processors, the OPE encryption method of the present invention enables order-preserving encryption to be performed on general purpose computing devices, which would otherwise be prohibitive due to speed or precision limitations. Hardware floating point processors generally cannot provide the precision needed for OPE while software floating point libraries generally cannot provide the speed of computation needed for practical real-world application of OPE. The OPE encryption method of the present invention combines the use of one or more software libraries and the hardware processor in a manner to enable a general purpose computer to perform computations for order-preserving encryption.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method in a network intermediary for performing order-preserving encryption of an input plaintext and generating an output ciphertext where the output ciphertext preserves the sort order of the input plaintext, the method comprising:
   receiving, at the network intermediary, the input plaintext from a user device to be stored on a cloud service provider;
   performing, using a processor, order-preserving encryption of the input plaintext using a random order-preserving function starting at an initial ciphertext space of N number of possibilities;
   performing, using the processor to call a software arbitrary precision floating point library, a binary search of the random order-preserving function for the input plaintext to reduce the initial ciphertext space to N/2 possibilities;
   in response to a size of the ciphertext space being greater than a first number of possibilities, repeating the performing of the binary search of the random order-preserving function for the input plaintext using the processor to call the software arbitrary precision floating point library to continue to reduce the number of possibilities in the ciphertext space;
   in response to the size of the ciphertext space being reduced to less than the first number of possibilities, switching the processor from calling the software arbitrary precision floating point library to calling a hardware fixed precision floating point processor to perform the binary search of the random order-preserving function for the input plaintext, wherein the hardware fixed precision floating point processor is configured to handle fewer number of bits of the ciphertext space at increased speed than the software arbitrary precision floating point library to speed up remaining computations to search for the input plaintext in the random order-preserving function;
   in response to a domain space of the input plaintext converging, selecting an element of the ciphertext space corresponding to the converged domain space and providing the selected element as the output ciphertext, the output ciphertext being used as an encrypted text of the input plaintext; and
   transmitting the encrypted text of the input plaintext from the network intermediary to the cloud service provider to store at the cloud service provider, the encrypted text preserving the sort order of the input plaintext and enabling data query of the stored encrypted data at the cloud service provider.

2. The method of claim 1, wherein performing, using the processor, order-preserving encryption of the input plaintext using the random order-preserving function comprises:
   performing, using the processor, order-preserving encryption of the input plaintext by using a hypergeometric probability distribution to recursively sample the random order-preserving function.

3. The method of claim 1, wherein the ciphertext space being greater than or less than the first number of possibilities comprises a ciphertext space being greater than or less than $2^P$ possibilities and a data string being processed having greater than or less than P databits.

4. A system for performing order-preserving encryption of an input plaintext and generating an output ciphertext where the output ciphertext preserves the sort order of the input plaintext, the system comprising:
   a processor configured to:
   receive, at a network intermediary, the input plaintext from a user device to be stored on a cloud service provider;
   perform, using a processor, order-preserving encryption of the input plaintext using a random order-preserving function starting at an initial ciphertext space of N number of possibilities;
   perform, using the processor to call a software arbitrary precision floating point library, a binary search of the random order-preserving function for the input plaintext to reduce the initial ciphertext space to N/2 possibilities;
   in response to a size of the ciphertext space being greater than a first number of possibilities, repeat the performing of the binary search of the random order-preserving function for the input plaintext using the processor to call the software arbitrary precision floating point library to continue to reduce the number of possibilities in the ciphertext space;
   in response to the size of the ciphertext space being reduced to less than the first number of possibilities, switch the processor from calling the software arbitrary precision floating point library to calling a hardware fixed precision floating point processor to perform the binary search of the random order-preserving function for the input plaintext, wherein the hardware fixed precision floating point processor is configured to handle fewer number of bits of the ciphertext space at increased speed than the software arbitrary precision floating point library to speed up remaining computations to search for the input plaintext in the random order-preserving function;

in response to a domain space of the input plaintext converging, select an element of the ciphertext space corresponding to the converged domain space and providing the selected element as the output ciphertext, the output ciphertext being used as an encrypted text of the input plaintext; and transmitting the encrypted text of the input plaintext from the network intermediary to the cloud service provider to store at the cloud service provider, the encrypted text preserving the sort order of the input plaintext and enabling data query of the stored encrypted data at the cloud service provider; and a memory coupled to the processor and configured to provide the processor with instructions.

5. The system of claim 4, wherein the processor is further configured to perform order-preserving encryption of the input plaintext by using a hypergeometric probability distribution to recursively sample the random order-preserving function.

6. The system of claim 4, wherein the ciphertext space being greater than or less than the first number of possibilities comprises a ciphertext space being greater than or less than $2^P$ possibilities and a data string being processed having greater than or less than P databits.

7. A method in a network intermediary for performing order-preserving encryption of an input plaintext and generating an output ciphertext where the output ciphertext preserves the sort order of the input plaintext, the method comprising:

receiving, at the network intermediary, the input plaintext from a user device to be stored on a cloud service provider;

performing, using a processor, order-preserving encryption of the input plaintext using a random order-preserving function starting at an initial ciphertext space of N number of possibilities;

performing, using the processor to call a first software arbitrary precision floating point library, a binary search of the random order-preserving function for the input plaintext to reduce the initial ciphertext space to N/2 possibilities;

in response to a size of the ciphertext space being greater than a first number of possibilities, repeating the performing of the binary search of the random order-preserving function for the input plaintext using the processor to call the first software arbitrary precision floating point library to continue to reduce the number of possibilities in the ciphertext space;

in response to the size of the ciphertext space being reduced to less than the first number of possibilities, switching the processor from calling the first software arbitrary precision floating point library to calling a second software floating point library to perform the binary search of the random order-preserving function for the input plaintext to continue to reduce the number of possibilities in the ciphertext space, wherein the second software floating point library has less precision than the first software arbitrary precision floating point library;

in response to a size of the ciphertext space being less than the first number of possibilities and greater than a second number of possibilities, the second number of possibilities being less than the first number of possibilities, repeating the performing of the binary search of the random order-preserving function for the input plaintext using the processor to call the second software floating point library to continue to reduce the number of possibilities in the ciphertext space;

in response to the size of the ciphertext space being reduced to less than the second number of possibilities, switching the processor from calling the second software floating point library to calling a hardware fixed precision floating point processor to perform the binary search of the random order-preserving function for the input plaintext, wherein the hardware fixed precision floating point processor is configured to handle fewer number of bits of the ciphertext space at increased speed than the first and second software floating point libraries to speed up remaining computations to search for the input plaintext in the random order-preserving function;

in response to a domain space of the input plaintext converging, selecting an element of the ciphertext space corresponding to the converged domain space and providing the selected element as the output ciphertext, the output ciphertext being the encrypted text of the input plaintext, the output ciphertext being used as an encrypted text of the input plaintext; and transmitting the encrypted text of the input plaintext from the network intermediary to the cloud service provider to store at the cloud service provider, the encrypted text preserving the sort order of the input plaintext and enabling data query of the stored encrypted data at the cloud service provider.

8. The method of claim 7, wherein performing, using the processor, order-preserving encryption of the input plaintext using the random order-preserving function comprises:

performing, using the processor, order-preserving encryption of the input plaintext by using a hypergeometric probability distribution to recursively sample the random order-preserving function.

9. The method of claim 7, wherein the ciphertext space being greater than or less than the first number of possibilities comprises a ciphertext space being greater than or less than $2^P$ possibilities and a data string being processed having greater than or less than P databits.

10. The method of claim 9, wherein the ciphertext space being greater than or less than the second number of possibilities comprises a ciphertext space being greater than or less than $2^{P2}$ possibilities and a data string being processed having greater than or less than P2 databits.

11. The method of claim 7, wherein the second software floating point library comprises a software arbitrary precision floating point library.

12. The method of claim 7, wherein the second software floating point library comprises a software fixed precision floating point library.

* * * * *